United States Patent [19]

Wehler et al.

[11] Patent Number: 5,174,104
[45] Date of Patent: Dec. 29, 1992

[54] GUIDE CHAIN FOR GUIDING ENERGY LINES

[75] Inventors: Herbert Wehler, Neunkirchen; Paul-Werner Mack, Wenden; Willibald Weber, Netphen, all of Fed. Rep. of Germany

[73] Assignee: Kabelschlepp GmbH, Siegen, Fed. Rep. of Germany

[21] Appl. No.: 839,573

[22] Filed: Feb. 21, 1992

[30] Foreign Application Priority Data

Feb. 22, 1991 [DE] Fed. Rep. of Germany ....... 4105651

[51] Int. Cl.$^5$ .............................................. F16G 13/16
[52] U.S. Cl. ..................................... 59/78.1; 59/900; 248/49
[58] Field of Search .................... 59/78, 78.1, 900; 248/48, 49, 50, 51, 78

[56] References Cited

U.S. PATENT DOCUMENTS

| 3,921,388 | 11/1975 | Loos et al. | 59/78.1 |
| 4,800,714 | 1/1989 | Moritz | 59/78.1 |
| 5,048,283 | 9/1991 | Mortiz et al. | |

FOREIGN PATENT DOCUMENTS

| 0246502 | 6/1990 | European Pat. Off. | |
| 3810452 | 4/1989 | Fed. Rep. of Germany | 59/78.1 |
| 3928238 | 8/1989 | Fed. Rep. of Germany | |
| 9102121 | 2/1991 | Fed. Rep. of Germany | |
| 9102122 | 2/1991 | Fed. Rep. of Germany | |

*Primary Examiner*—David Jones
*Attorney, Agent, or Firm*—Robert W. Becker & Associates

[57] ABSTRACT

A guide chain for guiding energy lines from a stationary connection to a movable consuming device consists of a plurality of chain members that are connected with one another as to be pivotable about a pivot angle. Each chain member is comprised of two side portions arranged at a distance parallel to one another and connected by two transverse elements. The pivot angle between two neighboring chain members is limited by stop inserts which are inserted into corresponding recessed portions of the side portions. In order to adapt the pivot angle of two neighboring chain members to different applications, it is suggested that the stop insert is provided as a disk with at least two cutouts whereby at least one cutout is in the form of a radial slot and the outer cutout is arc-shaped. The slot and the arc-shaped cutout are arranged at an angle α relative to one another. Within the recessed portions of the side portions, stops are provided which engage the slot, respectively, the arc-shaped cutout.

4 Claims, 3 Drawing Sheets

GUIDE CHAIN FOR GUIDING ENERGY LINES

BACKGROUND OF THE INVENTION

The present invention relates to a guide chain for guiding energy lines, especially electric lines and hoses, from a stationary connection to a movable consuming device, whereby the guide chain comprises a plurality of chain members that are pivotably connected with one another and are comprised of two side portions arranged at a distance parallel to one another and connected by two transverse elements, the pivot angle between the individual chain members being limited by respective stop inserts.

Guide chains of the aforementioned kind have been known in the prior art. For example, a guide chain is known from U.S. Pat. No. 5,048,283 which comprises chain members having two side portions arranged at a distance parallel to one another and connecting transverse elements, wherein the pivot angle is limited by stop inserts. The stop inserts are connected via crosspieces which engage corresponding cutouts of the side portions. Furthermore, the stop inserts are provided with rounded heads which engage rounded bores of the side portions. With this known guide chain, the pivot angle of neighboring chain members is limited by stops which engage curved recesses of neighboring side portions. The stops, respectively, formed recesses of the respective side portions determine a certain maximum pivot angle which, in return, determines a certain radius of curvature for the guide chain. In order to reduce the pivot angle, respectively, enlarge the radius of curvature, the stop inserts may be inserted into the respective recesses. The stops, together with the connecting crosspieces, form a ring.

The known guide chain has been employed successfully for guiding energy lines from a stationary connection to a movable consuming device.

Based on the prior art disclosed above, it is an object of the present invention to provide a guide chain in which the radius of curvature may be adapted to the requirements of a given application in a simple manner by rotating or exchanging the stop inserts.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
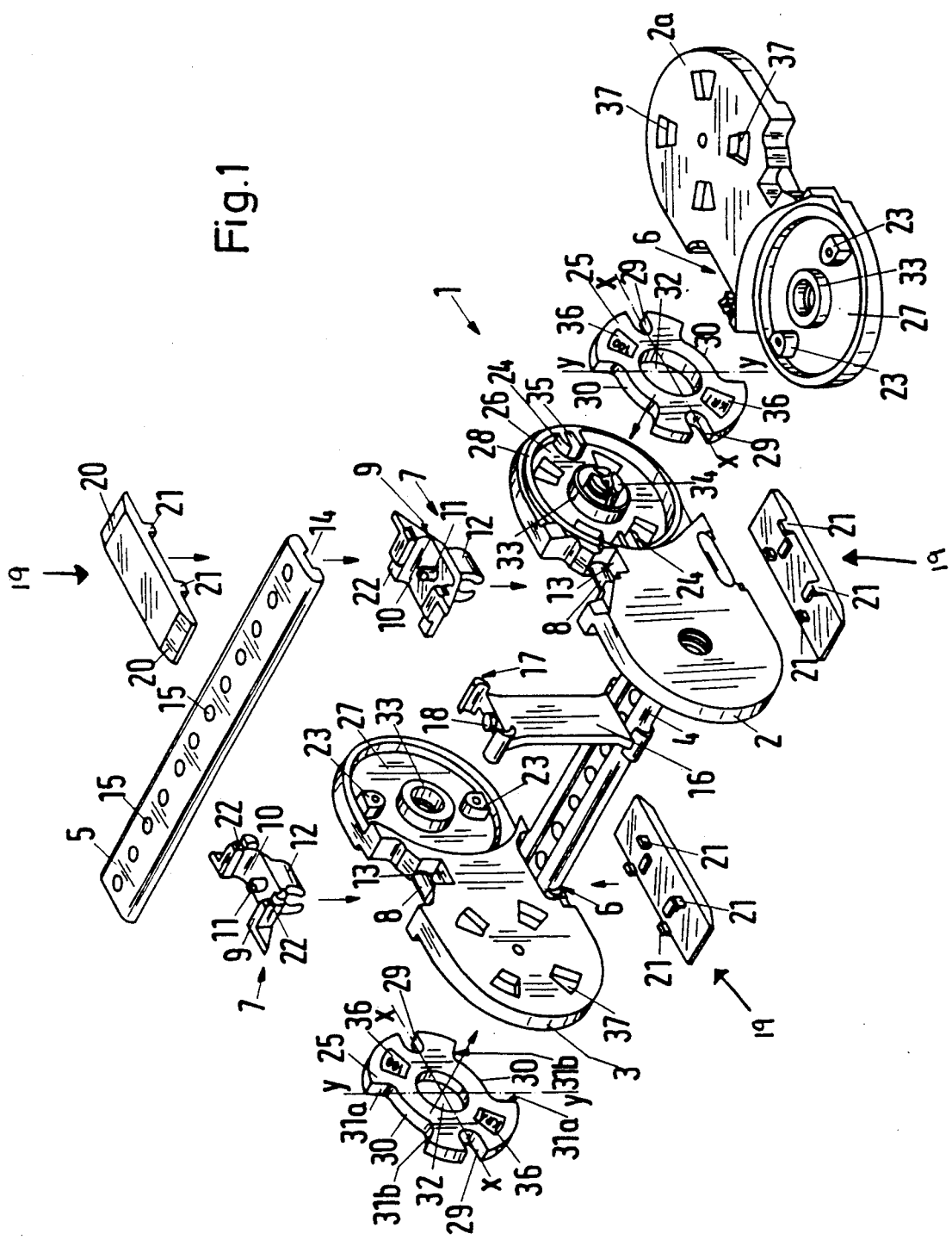
FIG. 1 shows a chain member of a guide chain in an exploded perspective view.
Figure 2:
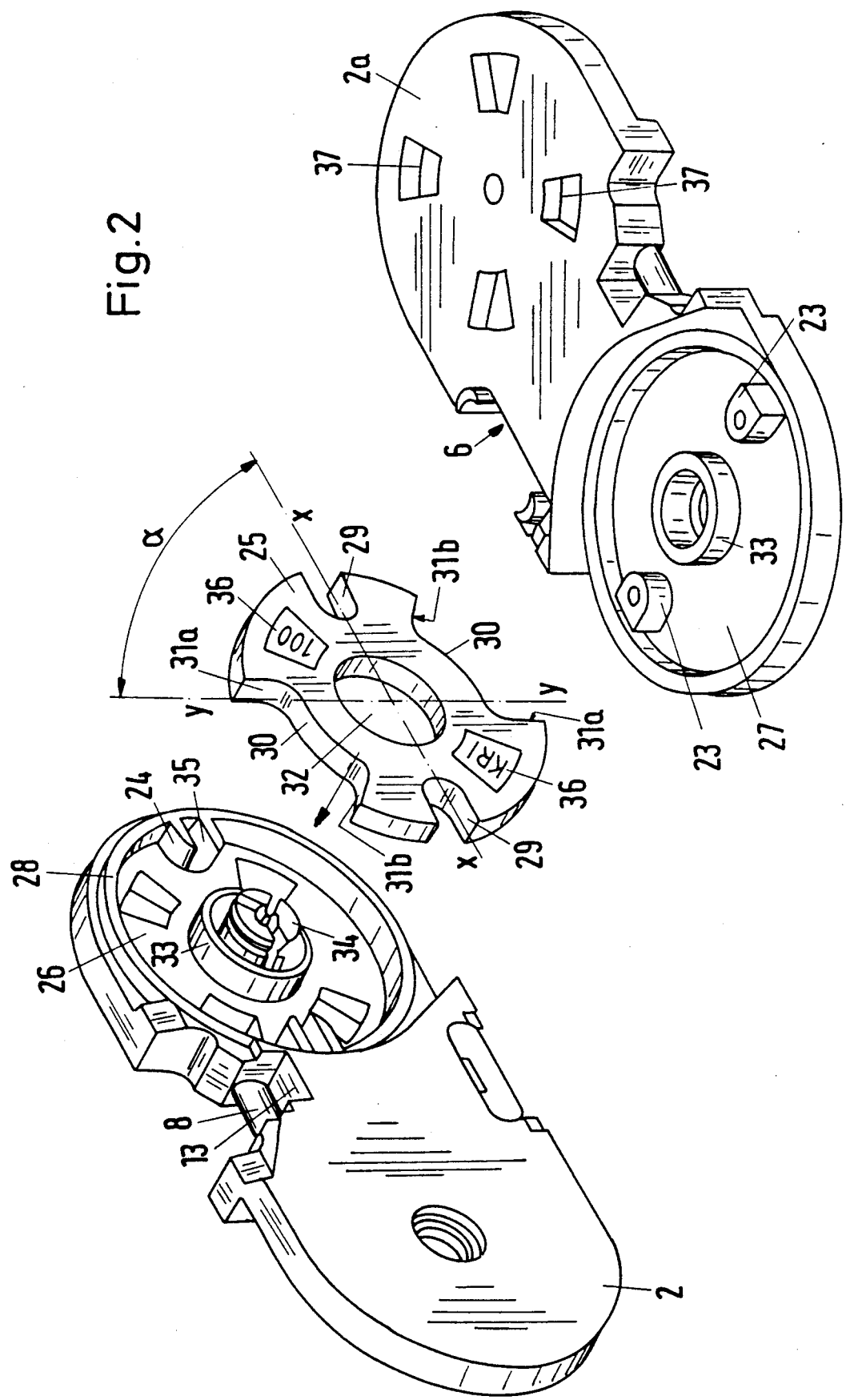
FIG. 2 shows two neighboring side portions with a stop insert in an exploded perspective view.

The guide chain of the present invention is primarily characterized by a plurality of chain members that are connected with one another as to be pivotable about a pivot angle, whereby each one of the chain members is comprised of: Two side portions arranged at a distance parallel to one another, each one of the side portions having a first recessed portion in an outwardly oriented phase thereof and a second recessed portion in an inwardly oriented phase thereof; two transverse elements connecting the side portions with one another; a disk-shaped stop insert for limiting the pivot angle, the stop insert being fixedly inserted into the first recessed portion, the stop insert having two radially extending slots arranged diametrically oppositely one another and two cutouts arranged diametrically oppositely one another, whereby the cutouts are arc-shaped and spaced at a staggering angle relative to the radially extending slots, the cutouts determining the pivot angle; and stops being fastened to the side portion within the first and second recessed portions, the stops engaging the radially extending slots and the cutouts of the disk-shaped stop insert.

In a preferred embodiment, first ones of the stops are arranged within the first recessed portion along a longitudinal axis of the side portion, the first stops engaging the radially extending slots, and second ones of the stops are arranged within the second recessed portion displaced by a displacement angle relative to the longitudinal axis, whereby the second stops engage the cutouts of the disk-shaped stop insert of a neighboring one of the side portions within the guide chain. The displacement angle is preferably 90°.

The cutout may be provided with a first and a second abutment surface, whereby the staggering angle between the first abutment surface and the adjacent radially extending slot is 90°.

According to the present invention a guide chain is proposed in which the stop inserts engage corresponding recessed portions of the side portions in a non-rotatable manner and are provided with two diametrically oppositely arranged slots, respectively, cutouts which in connection with the stops limit the pivot angle of neighboring chain members, whereby the slots are radially disposed within the disk-shaped stop inserts, and the cutouts are arc-shaped and disposed at an angle relative to the slots.

An inventively embodied guide chain has the advantage that the stop insert which is of a simple design is inserted into recessed portions of two neighboring side portions. A respective stop of a side portion engages the slot of the stop insert and fixes the stop insert in a non-rotatable manner within the recessed portion of the side portion. The second stop is guided within the arc-shaped cutout of the stop insert so that the size of the cutout determines the pivot angle of neighboring chain members. The stop inserts may be provided with differently sized arc-shaped cutouts so that by inserting stop inserts of varying cutout sizes between neighboring side portions the pivot angle may be adapted to different applications of the guide chain.

In a practical embodiment of the invention, first stops within a first recessed portion of the side portion are arranged along a longitudinal axis of the side portion, while the second stops within the second recessed portion of the side portion are displaced by a displacement angle αrelative to the longitudinal axis of the side portion. This embodiment facilitates the assembly and especially the insertion of the stop insert of the guide chain. The displacement angle α is preferably 90° so that a maximum pivot angle between neighboring side portions in both directions relative to the longitudinal axis o the guide chain is possible.

A satisfactory guiding of the stops within the arc-shaped cutouts is achieved by providing two diametrically oppositely arranged slots within the stop inserts and two diametrically oppositely arranged cutouts which determine the pivot angle between neighboring chain members. With such an embodiment it is furthermore advantageous that the stop insert be fixed in a non-rotatable manner by two stops engaging the two slots within the side portion. Furthermore, the stop insert may be inserted into the recessed portion of the side portion after being rotated about its axis x or y so that the pivot angle between two neighboring side portions may be adjusted in one or the other direction, as desired.

A safe limitation of the pivot angle is achieved by providing the arc-shaped cutout with two abutment surfaces and by providing a staggering angle α of 90° between the first abutment surface and the adjacent slot so that the side portions may be transferred from a stretched position into a bent or angled position. When, for example, the arc-shaped cutout, with its first abutment surface being staggered at a staggering angle of 90° relative to the adjacent slot, extends in a clockwise direction, then two neighboring side portions may be pivoted in a clockwise direction from their stretched position about an angle which is determined by the arc-shaped cutout. On the other hand, two neighboring side portions are pivotable from their stretched position in a counter-clockwise direction when the arc-shaped cutout extends in a mathematically positive direction from its first abutment surface which is staggered at an angle of 90° relative to the adjacent slot. Due to this simple embodiment of the stop insert, it is possible to change the orientation of the pivot angle by simply rotating the stop insert of the guide chain about its respective x or y axis.

In order to be able to determine the pivoting direction of the guide chain without disassembling the side portions, it is inventively suggested to provide the side portions with openings through which respective markings on the stop insert may be visible. These markings may be provided in the form of letters or numbers on the stop inserts The letters indicate the pivoting direction and the numbers indicate the size of the pivot angle.

Furthermore, it is suggested that the stop insert is provided with a central bore which engages respective pegs provided at the recessed portions. The side portions of neighboring chain members are then connected with one another by connecting elements arranged within the pegs of the recessed portions. This embodiment ensures a simple assembly of the guide chain. Furthermore, the central bore, in conjunction with the pegs provided within the recessed portion of the side portion, ensures an exact positioning of the stop insert within the recessed portion of two neighboring side portions. This embodiment also provides for an optional automatic assembly of the guide chain.

Description of Preferred Embodiments

The present invention will now be described in detail with the aid of several specific embodiments utilizing FIGS. 1 through 4.

A chain member 1 is comprised of two side portions 2 and 3 which are arranged at a distance parallel to one another and which are connected to one another by transverse elements 4 and 5, thus enclosing an energy line channel. The transverse element 4, over its entire length, has a flattened cross-section with rounded narrow sides and may be inserted into cutouts 6, provided with undercuts, of the narrow sides of the side portions 2 and 3, whereby the transverse element 4 is connected in a frictional and form-locking manner to the cutouts 6 of the side portions 2 and 3 by performing a rotating insertion about its longitudinal axis. The transverse element 5 is also provided with a flattened cross-section over its entire length and with rounded narrow sides. It may be mounted in a pivotable manner on respective pivot joints 7 provided at the narrow sides of the side portions 2 and 3.

The pivot joints 7 are comprised of a lug element 8 arranged within the side portions 2, 3 and a holding member 9 which is pivotably clamped onto the lug element 8, the holding member 9 having an essentially U-shaped cutout 10. The cutout 10, in which the transverse element 5 is mounted in a frictional and form-locking manner by a rotational insertion about its longitudinal axis and connected to the holding member 9 is provided with a pin 11. The holding member 9 is further provided with a spring clip 12 at its underside with which the holding member 9 is clamped onto the lug element 8. The lug element 8 is arranged in a cutout 13 fo the side portion 2, 3 and extends in a longitudinal direction of the side portions 2, 3.

The transverse elements 4 and 5 both have a flattened cross-section with rounded narrow sides over their entire length. One of the flat sides of the transverse elements 4 and 5 is provided with a groove 14 extending in the longitudinal direction of the transverse elements 4, 5. Furthermore, the transverse elements 4, 5 are provided with a plurality of bores 15. The pins 11 engage the two outwardly positioned bores 15 of the transverse element 5 upon insertion into the holding member 9 so that the transverse element 5 is fixedly connected in a transverse direction relative to the longitudinal extension of the chain member 1. The transverse elements 4 and 5 may be connected to the side portions 2 and 3 such that the groove 14 is inwardly or outwardly oriented.

Between the transverse elements 4, 5, a separating cross-piece 16 is provided which has U-shaped holders 17 at its upper and lower ends. Pins 18 for engagement with the bores 15 of the transverse elements 4, 5 are connected to the holders 17. The length of the pins 18 corresponds to the depth of the groove 14. In this manner, the separating cross-piece 16 is slidable in the longitudinal direction of the transverse elements 4, 5 when the transverse elements 4, 5 are attached to the side portions 2, 3 with the groove 14 facing inwardly. When the grooves 14 of the transverse element 4, 5 are outwardly oriented, the pins 18 of the separating cross-piece 16 engage the bores 15 of the transverse elements 4, 5 so that the separating cross-piece 16 is no longer slidable in the longitudinal direction of the transverse elements 4, 5. Of course, it is also possible to provide a plurality of separating cross-pieces 16 between the transverse elements 4, 5 of one chain member 1.

At the upper and lower narrow sides of the side portions 2, 3 gliders 19 are detachably mounted which may glide one on the other when the guide chain is bent and the upper portion of the guide chain is supported on the lower portion of the guide chain. The length of the gliders 19 is determined such that the distance between neighboring side portions 2, 2a is bridged. The gliders 19 are directly attached to the lower narrow sides of the side portions 2, 3 and indirectly connected to the upper narrow sides of the side portions 2, 3, that is, via the holding member 9 of the pivot joint 7.

Each glider 19 is plate-shaped, and the surface facing away from the narrow sides of the side portions 2, 3 is provided with two slanted portions 20 oriented in the longitudinal direction of the glider 19. At the underside of the glider 19 four catch elements 21 are provided which are insertable into respective cutouts 22 at the side portions 2, 3, respectively, at the holding member 9.

The relative pivot angle of neighboring chain members 1 is determined by stops 23, 24 and a stop insert 25. The stops 24 of the side portion 2 are arranged within a recessed portion 26 of the side portion 2 and are positioned along the longitudinal axis of the side portion 2. The stops 23 at one end of the side portion 2a are staggered about a displacement angle of 90° relative to the stops 24 at the other end of the same side portion 2a and positioned in a respective recessed portion 27. Accordingly, the connecting line between the stops 23 is perpendicular to the longitudinal axis of the side portion 2a, while the two other stops 24 are arranged on the longitudinal axis of the side portion 2a. The side portions 2, 3 have a rim 28 which encloses the recessed portion 26 whereby the outer diameter of the rim 28 is slightly smaller than the inner diameter of the circular recessed portion 27 which is engaged by the rim 28 upon assembly.

The stop insert 25, which is inserted into the respective recessed portions 26 and 27 between neighboring side portions 2 and 2a, is essentially disk-shaped. The stop insert 25 is provided with two diametrically oppositely arranged slots 29 and two diametrically oppositely arranged cutouts 30. The slots 29 have a width that corresponds to the width of the stops 23, respectively, 24 while the cutouts 30 are arc-shaped and determine the pivot angle of neighboring chain members 1. The cutouts 30 have a respective first and second abutment surface 31a, 31b, the respective abutment surfaces 31a and 31b being diametrically oppositely arranged relative to one another at the stop insert 25. In the embodiment represented in the staggered at a staggering angle of 90° in the mathematically positive direction relative to the adjacent slot 29. The angle between the abutment surfaces 31a and 31b in the represented embodiment is approximately 60°.

The stop inserts 25 have a central bore 32 through which respective pegs 33 arranged within the recessed portions 26, 27 penetrate. The side portions 2, 2a of neighboring chain members 1 are connected via connecting elements 34 whereby the stop inserts 25 are arranged in the recessed portions 26, respectively, 27 of the side portions 2, 2a such that the slots 29 enclose the stops 24. The stops 24 are provided with a slot 35 extending in a radial direction. With this arrangement, the stop insert 25 is fixedly connected within the side portions 2 and the stops 23 of the side portion 2a are guided within the diametrically oppositely arranged cutouts 30 of the stop insert 25. The relative pivoting angle between the chain members 1 is thus limited by the abutment surfaces 31a and 31b, the chain members being represented only by a respective side portion 2, 2a. Due to the arrangement of the abutment surface 31a at a right angle to the slots 29 and the special embodiment of the cutout 30, the neighboring chain members 1 may be pivoted from their stretched position in only one direction about an angle that corresponds to the angle delimited by the abutment surfaces of the cutout 30. In order to change the pivoting direction of the chain members 1 relative to one another, it is now only necessary to insert the stop insert 25, rotated 180° about its axis x or y, into the recessed portion 26, 27.

For displaying the pivoting direction and the pivoting angle, the stop inserts 25 which are comprised of a plastic material are provided with markings 36 which are visible through respective openings 37 within the side portions 2, 3, 2a. The markings 36 are comprised of a letter combination as well as numbers, whereby the letter combination indicates the direction of rotation, that is, clockwise or counter-clockwise, and the number indicates the size of the pivot angle. Accordingly, the pivoting direction as well as the size of the pivot angle may be determined without disassembling the side portions 2, 2a.

Figure 3:
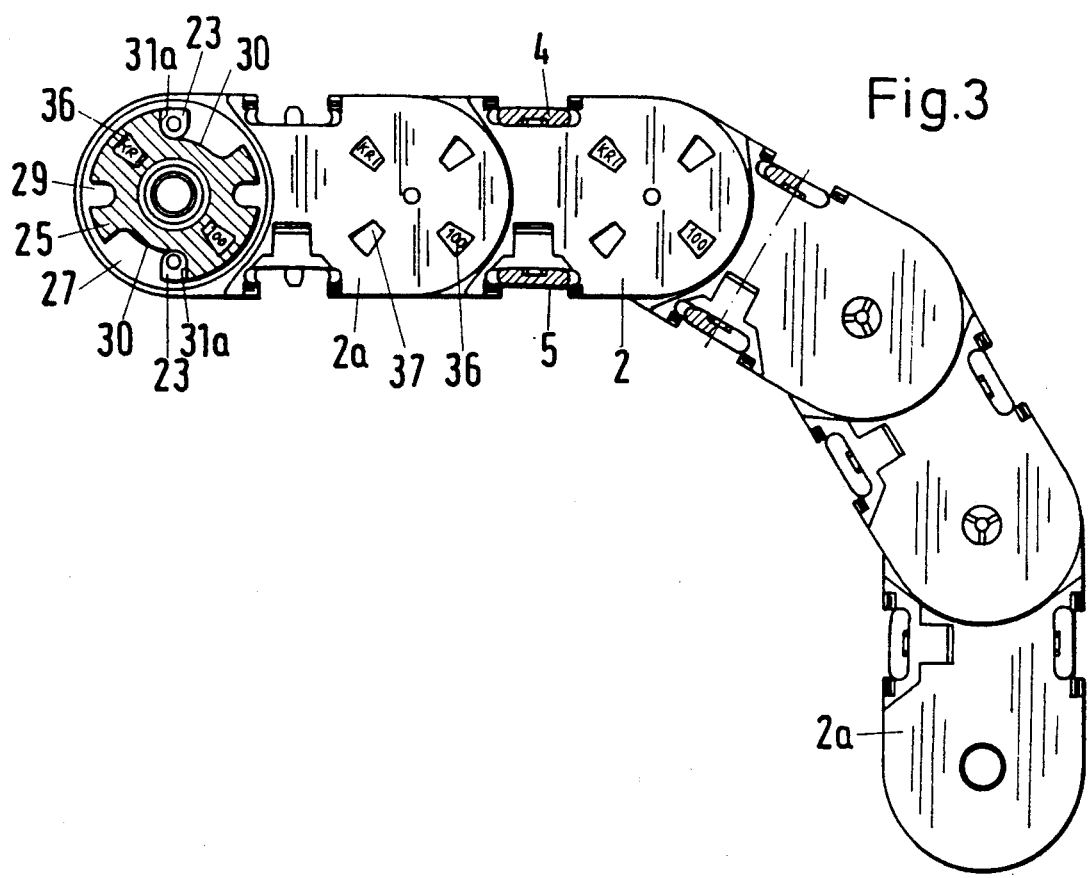
FIG. 3 shows a guide chain which is bent in a clockwise direction.

FIG. 3 shows a section of a guide chain in which the chain members 1 are pivoted from their stretched position in a clockwise direction. The arc-shaped cutouts 30 extend in the clockwise direction from the abutment surface 31a which is staggered clockwise at an angle of 90° relative to the adjacent slot 29.

Figure 4:
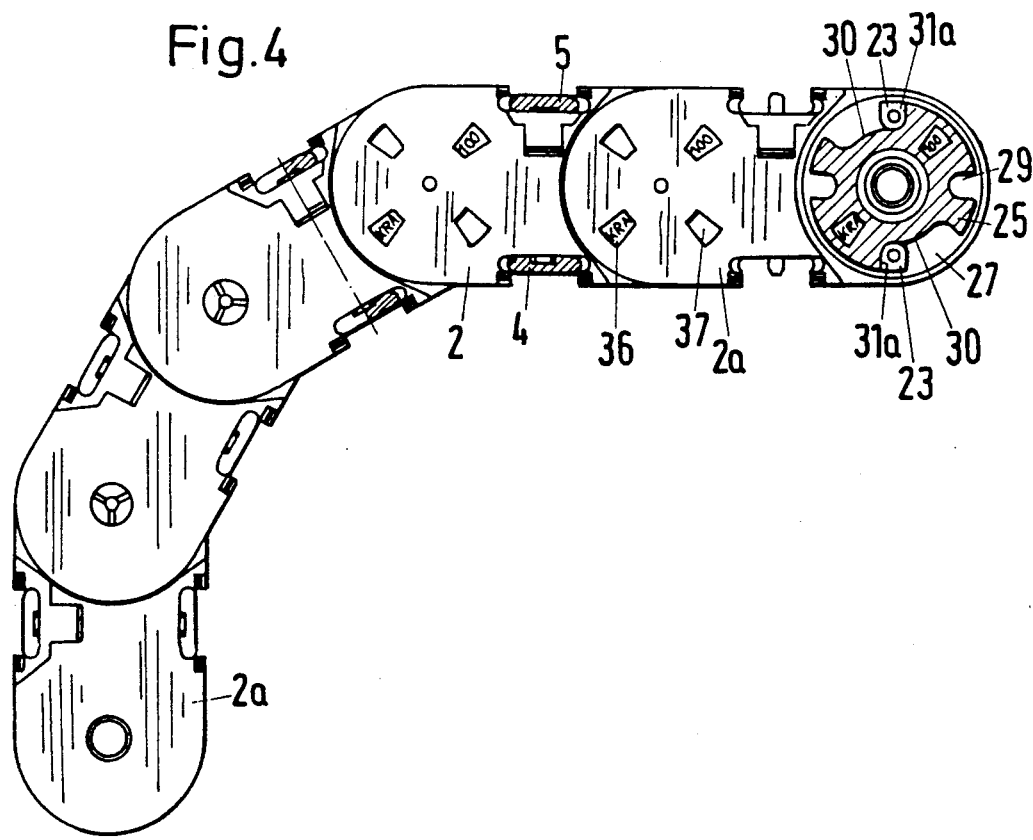
FIG. 4 shows a guide chain bent in a counter-clockwise direction.

FIG. 4 shows an embodiment of the guide chain which essentially corresponds to the guide chain of FIG. 3, however, the stop inserts 25 in this embodiment are rotated 180° about one of their axis x or y and inserted into the respective recessed portion 26, 27 so that the arc-shaped cutouts 30 now extend in a counter-clockwise direction with respect to the slots 29.

In the embodiment of FIG. 3, the pivot joints 7 are arranged at the side of the side portions 2, 2a, 3 which is facing the inner radius of the curvature so that the transverse elements 5 of the individual chain members 1 may be opened at this side. The transverse elements 4 which are arranged at the outer radius of curvature of the guide chain may be rotated out of the respective cutouts 6 so that the guide chain may be opened at this side also.

In the embodiment of FIG. 4, the pivot joints 7 are arranged at the outer radius of curvature, while at the opposite side of the side portions 2, 2a, 3 the transverse elements 4 are inserted into the cutouts 6. In this guide chain the outwardly oriented side of the side portions may be opened by removing the transverse elements 5 from the pivot joints 7, while the individual chain members 1 may be opened at the side corresponding to the inner radius of curvature simply by rotating the transverse elements 4 from their cutouts 6.

The present invention is, of course, in no way restricted to the specific disclosure of the specification and drawings, but also encompasses any modifications within the scope of the appended claims.

What we claim is:

1. A guide chain for guiding energy liens from a stationary connection to a movable consuming device, said guide chain comprising:

a plurality of chain members being connected with one another as to be pivotable about a pivot angle, each one of said chain members being comprised of:

two side portions arranged at a distance parallel to one another, each one of said side portions having a first recessed portion in a face outwardly oriented relative to said chain member and a second recessed portion in a face inwardly oriented relative to said chain member;

two transverse elements connecting said side portions with one another;

a disk-shaped stop insert for limiting said pivot angle, said stop insert being fixedly inserted into said first recessed portion, said stop insert having two radially extending slots arranged diametrically oppositely one another and two cutouts arranged diametrically oppositely one another, said cutouts being arc-shaped and spaced at a staggering angle relative to said radially extending slots, said cutouts determining said pivot angle;

stops being fastened to said side portion within said first and second recessed portions, said stops engaging said radially extending slots and said cutouts of said disk-shaped stop insert, with first ones of said stops arranged within said first recessed portion along a longitudinal axis of said side portion, said first stops engaging said radially extending slots, and second ones of said stops arranged within said second recessed portion displaced by a displacement angle relative to said longitudinal axis, said second stops engaging said cutouts of said disk-shaped stop insert of a neighboring one of said guide portions within said guide chain.

2. A guide chain according to claim 1, wherein said displacement angle is 90°.

3. A guide chain according to claim 1, wherein each of said cutouts is provided with a first and a second abutment surface, with said staggering angle between said first abutment surface and an adjacent one of said radially extending slots being 90°.

4. A guide chain according to claim 1, wherein said stop insert has markings and said side portions have openings in said outwardly oriented faces, said markings being visible through said openings.

* * * * *